US008317109B2

(12) United States Patent
Englebardt et al.

(10) Patent No.: US 8,317,109 B2
(45) Date of Patent: Nov. 27, 2012

(54) PAYMENT DEVICE WITH AUDIO AND/OR VISUAL CAPABILITY AND ASSOCIATED METHOD

(75) Inventors: Leland Stanford Englebardt, New York, NY (US); John Wankmueller, Great Neck, NY (US); David A Roberts, Warrington (GB)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 13/160,892

(22) Filed: Jun. 15, 2011

(65) Prior Publication Data

US 2011/0309154 A1 Dec. 22, 2011

Related U.S. Application Data

(62) Division of application No. 12/019,679, filed on Jan. 25, 2008, now Pat. No. 7,988,058.

(60) Provisional application No. 60/898,220, filed on Jan. 30, 2007.

(51) Int. Cl.
*G06K 19/06* (2006.01)
(52) U.S. Cl. ........................................ 235/492; 235/451
(58) Field of Classification Search .................. 235/487, 235/492
See application file for complete search history.

(56) References Cited

U.S. PATENT DOCUMENTS

| 5,741,184 | A  | * | 4/1998 | Takemoto et al. | ............... | 463/43 |
| 6,536,671 | B1 | * | 3/2003 | Baentsch | ...................... | 235/487 |
| 6,902,116 | B2 |   | 6/2005 | Finkelstein | | |
| 7,147,156 | B2 |   | 12/2006 | Divine | | |
| 2004/0220807 | A9 | | 11/2004 | Tamir | | |
| 2006/0289632 | A1 | | 12/2006 | Walker | | |
| 2007/0012763 | A1 | | 1/2007 | Van de Velde et al. | | |
| 2007/0241201 | A1 | | 10/2007 | Brown et al. | | |
| 2007/0290052 | A1 | | 12/2007 | Dean et al. | | |
| 2008/0021824 | A1 | | 1/2008 | Kranzley | | |
| 2008/0054077 | A1 | * | 3/2008 | Zellner et al. | .................. | 235/492 |
| 2008/0223925 | A1 | * | 9/2008 | Saito et al. | ..................... | 235/380 |

OTHER PUBLICATIONS nCryptone, Prosodie group, power embedded ISO cards and software management for secure authentication; www.ncryptone.com, Mar. 6, 2008.
Declaration by John Wankmueller, Joint Inventor of U.S. Appl. No. 12/019,679. Mastercard, May 27, 2008.
nCryptone, a Prosodie Group Company, Simplify and secure multi-channel electronic exchanges; http://www.ncryptone.com/produits/ncaudiocard.asp, (c) 2006.
ACT Canada's 2004 Partner; "Amenity One" Action Newsletter; http://www.actcda.com/resource/0411 and 12.htm; Dec. 7, 2004.

* cited by examiner

*Primary Examiner* — Thien M Le
*Assistant Examiner* — Christle Marshall
(74) *Attorney, Agent, or Firm* — Otterstedt, Ellenbogen & Kammer, LLP (57) ABSTRACT

A payment device includes a memory, a processor coupled to the memory, a communications module coupled to the processor and configured to interact with a payment terminal, a sound-producing element coupled to the processor, and an associated body portion. The memory is configured to store at least one representation of at least one sound and the processor is configured to cause the sound-producing element to produce a sound corresponding to the at least one representation of the at least one sound when such representation is stored in the memory, responsive to the communications module interacting with the payment terminal, substantially without usage of a battery on the device. Visual stimuli can be employed in addition to or in lieu of sounds. Sounds can be downloaded to devices with or without batteries, as part of a service offering.

3 Claims, 4 Drawing Sheets

PAYMENT DEVICE WITH AUDIO AND/OR VISUAL CAPABILITY AND ASSOCIATED METHOD

CROSS-REFERENCE TO RELATED APPLICATIONS

This patent application is a divisional of U.S. patent application Ser. No. 12/019,679, filed Jan. 25, 2008 now U.S. Pat. No. 7,988,058, entitled "PAYMENT DEVICE WITH AUDIO AND/OR VISUAL CAPABILITY AND ASSOCIATED METHOD," the complete disclosure of which is expressly incorporated herein by reference in its entirety for all purposes, which in turn claims the benefit of U.S. Provisional Patent Application Ser. No. 60/898,220 filed Jan. 30, 2007 and entitled "Payment Device With Audio and/or Visual Capability and Associated Method" of inventors Leland Stanford Englebardt et al. The disclosure of the aforementioned Provisional Patent Application Ser. No. 60/898,220 is also expressly incorporated herein by reference in its entirety for all purposes.

FIELD OF THE INVENTION

The present invention relates generally to the electronic and computer arts, and, more particularly, to apparatus and methods for electronic payments.

BACKGROUND OF THE INVENTION

Electronic payment devices, such as "smart" debit and credit cards, have increased in popularity. These may include "contacted" cards, which have a series of electrical contacts, and are powered by providing voltage to the contacts, as well as "contactless" cards, which employ an antenna coil.

U.S. Pat. No. 6,902,116 of Alan Finkelstein discloses a method for making a financial transaction card with embedded electronic circuitry. Financial transaction and similar cards are fabricated with a split core adapted to receive embedded electronic circuitry. The card core has two or more laminated layers. The cavity is milled into one or more of the layers to receive the electronic circuitry. The core layers are then laminated together, along with protective overlays. Alternative fabrication methods include co-extrusion and injection molding. The electronic circuitry may include a source of illumination. A source of electrical current is coupled to the source of illumination and a switch is provided to selectively close an electrical circuit between the source of electrical current and the source of illumination. A light is powered by one or more batteries disposed within the card. Conventional wafer cell batteries may be used; however, a flat laminated battery is preferred. It is asserted that the disclosed methods are applicable to cards with other types of electronic circuitry, including, for example, smart cards, cards with electronic displays, cards incorporating wireless communications, cards with sound generators, etc.

Use of batteries in payment devices, especially payment cards, is believed to be undesirable, as batteries may pose a safety and/or environmental concern due to the presence of harsh chemicals, and may also result in unnecessary expense.

SUMMARY OF THE INVENTION

Principles of the present invention provide techniques for payment devices with audio and/or visual capability, which need not employ batteries. An exemplary embodiment of a payment device for interacting with a payment terminal, according to an aspect of the invention, includes a memory, a processor coupled to the memory, a communications module, coupled to the processor, and configured to interact with the payment terminal, and a sound-producing element coupled to the processor. A body portion is associated with the memory, the processor, the communications module, and the sound-producing element. The memory is configured to store at least one representation of at least one sound and the processor is configured to cause the sound-producing element to produce a sound corresponding to the at least one representation of the at least one sound when such representation is stored in the memory, responsive to the communications module interacting with the payment terminal, substantially without usage of a battery on the device. Power can be provided, for example, from a contact interface in the communications module, or in a contactless approach, RF energy can be used to charge an on-device capacitor.

In another aspect, an exemplary payment device for interacting with a payment terminal includes a memory, a processor coupled to the memory, a communications module coupled to the processor and configured to interact with the payment terminal, and a visual-stimulus-producing element coupled to the processor. A body portion is associated with the memory, the processor, the communications module, and the visual-stimulus-producing element. The processor is configured to cause the visual-stimulus-producing element to produce a visual stimulus, responsive to the communications module interacting with the payment terminal, substantially without usage of a battery on the device. Power can be provided as described in the above paragraph.

An exemplary embodiment of a method of providing a service for payment device holders (which can be, at least in part, computer-implemented), according to yet another aspect of the invention, includes the steps of facilitating the holders obtaining electronic devices configured according to a payment infrastructure standard and having audio capability, and facilitating the holders obtaining representations of sounds to be stored in the memories.

Techniques of the invention can be implemented, for example, via a computer-readable medium storing program code that executes inventive method steps, and in an apparatus including a memory and at least one processor coupled to the memory and operative to implement inventive method steps. Further, a system or apparatus can include means for carrying out one or more method steps; the means can include hardware modules, software modules, or a combination of hardware and software modules.

One or more techniques of the present invention can provide one or more of the following substantial beneficial technical effects. These can include, for example, avoiding safety, environmental, and/or cost issues associated with battery-powered devices. In one or more embodiments, tones, jingles, songs, and/or portions of songs or music, and the like, may be provided, for example, from a credit or debit card issuer over a payment network. Today, such networks are typically provisioned to carry only payment data, while one or more embodiments of the invention support the transport of digital audio data directly into the smart card (powered as mentioned above). One such payment network is the CIRRUS® ATM network (registered trademark of MasterCard International Incorporated of Purchase, N.Y.) which could be modified to be able to support transport of such audio data in a fixed or variable format, apparent to the skilled artisan given the teachings herein. In one or more embodiments, the card issuer would provide to the cardholder personalized audio data, which can be changed on demand at the request of one or both parties. If the cardholder has a personal computer (PC) with a smart card reader, audio data can be sent over the Internet to the PC and then to the smart card.

These and other features and advantages of the invention will become apparent from the following detailed description of illustrative embodiments thereof, which is to be read in connection with the accompanying drawings.

BRIEF DESCRIPTION OF THE DRAWINGS

FIG. 1 shows an example of a payment infrastructure that an inventive device can interact with;

DETAILED DESCRIPTION OF PREFERRED EMBODIMENTS

Figure 1:
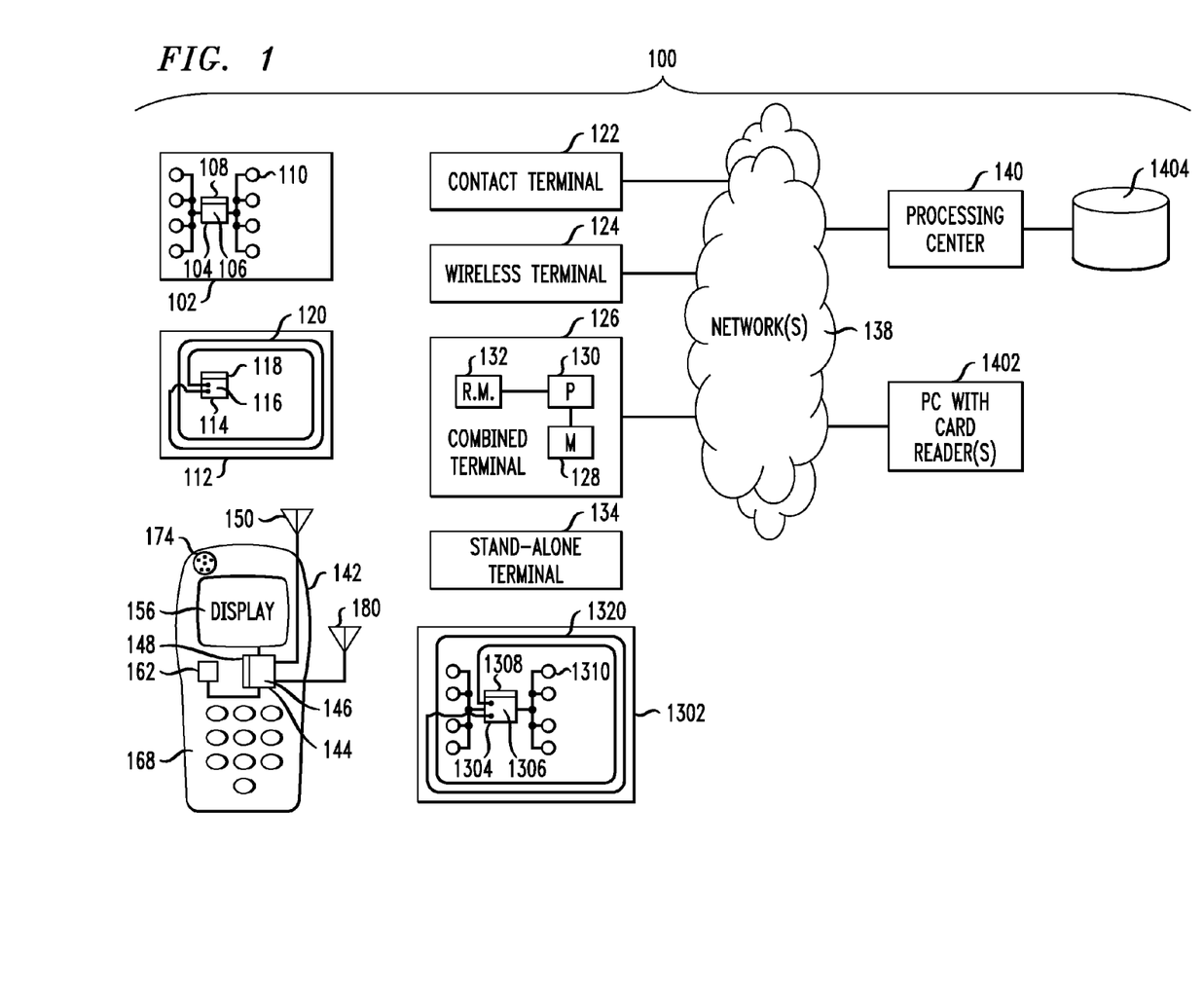

Attention should now be given to FIG. 1, which depicts an exemplary embodiment of a payment card infrastructure 100, together with various possible components thereof. System 100 can implement inventive techniques, and can interact with inventive payment devices. One type of typical payment device can be a contact device such as card 102. Card 102 can include an integrated circuit (IC) chip 104 having a processor portion 106 and a memory portion 108. A plurality of electrical contacts 110 can be provided for communication purposes. An example of a device similar to card 102, modified according to certain techniques of the invention, will be discussed below in connection with FIG. 2.

Infrastructure 100 can also work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. An example of a device similar to card 112, modified according to certain techniques of the invention, will be discussed below in connection with FIG. 3.

Note that cards 102, 112 are exemplary of a variety of devices that can be employed within the infrastructure. In one or more versions of the infrastructure, a dual-interface device 1302 is employed. Device 1302 is shown larger than devices 102, 112 for illustrative convenience but can have a similar form factor. Device 1302 includes an IC chip 1304 having a processor portion 1306 and a memory portion 1308. A plurality of electrical contacts 1310, similar to contacts 110, can be provided, as well as an antenna 1320 similar to antenna 120, together with an oscillator or oscillators, and/or additional appropriate circuitry for one or more of modulation, demodulation, downconversion, and the like, as described with regard to device 112. Appropriate firmware to manage the two available interfaces can be provided, with operation otherwise being similar to devices 102, 112. The description of devices, elements, or components 102, 104, 106, 108, 110, 112, 114, 116, 118, 120 throughout this document are equally applicable to the corresponding items 1302, 1304, 1306, 1308, 1310, 1320. Memories 108, 118, 148 (discussed below) and 1308 may further be divided into non-volatile and volatile memory.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN"). The memory portions or units 108, 118 can store the operating system of the cards 102, 112. The operating system loads and executes applications and provides file management or other basic card services to the applications. In some embodiments, one or more applications may "sit" directly on hardware, e.g., may be outside the domain of the operating system. One operating system that can be used to implement the present invention is the MULTOS® operating system licensed by StepNexus Inc. Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications as described herein. At present, one preferred standard to which such applications may conform is the EMV payment standard set forth by EMVCo, LLC (http://www.emvco.com). It will be appreciated that, strictly speaking, the EMV standard defines the behavior of a terminal; however, the card can be configured to conform to such EMV-compliant terminal behavior and in such a sense is itself EMV-compliant. It will also be appreciated that applications in accordance with the present invention can be configured in a variety of different ways.

As noted, cards 102, 112 are examples of a variety of payment devices that can be employed with the infrastructure. The primary function of the payment devices may not be payment, for example, they may be cellular phone handsets, or access cards for a public transportation system. Such devices could include cards having a conventional form factor, smaller or larger cards, cards of different shape, key fobs, personal digital assistants (PDAs), appropriately configured cell phone handsets, MP3 players, or indeed any device with the appropriate processing and memory capabilities. The cards, or other payment devices, can include memories 108, 118 and processors 106, 116 coupled to the memories. Optionally, body portions (e.g., laminated plastic layers of a payment card, case or cabinet of a PDA, chip packaging, and the like) are associated with memories 108, 118 and processors 106, 116. The memories 108, 118 can contain appropriate applications. The processors 106, 116 can be operative to execute one or more method steps to be described herein, for example, by executing code stored in the memories. The applications can be, for example, application identifiers (AIDs) linked to software code in the form of firmware plus data in a card memory such as an electrically erasable programmable read-only memory (EEPROM).

A number of different types of terminals can be employed with infrastructure 100. Such terminals can include a contact terminal 122 configured to interface with contact-type device 102, a wireless terminal 124 configured to interface with wireless device 112, or a combined terminal 126. Note that "contactless" and "wireless" are used in an interchangeable fashion herein and that the skilled artisan is familiar with the meaning of such terminology. Combined terminal 126 is designed to interface with either type of device 102, 112, and may also interface with conventional magnetic stripe cards or devices, or with cards or devices having account information encoded thereon in bar code form (other terminals might work with just magnetic stripe or just bar code devices). Terminals may be contact terminals with plug-in contactless readers. Combined terminal 126 can include a memory 128, a processor portion 130, and a reader module 132. Note that the principles of construction of terminal 126 are applicable to other types of terminals and are described in detail for illustrative purposes. Reader module 132 can be configured for contact communication with card or device 102, or contactless communication with card or device 112, or both (different types of readers can be provided to interact with different types of cards e.g., contacted or contactless). Module 132 could also have a magnetic stripe reader, and/or a bar code scanner. Terminals 122, 124, 126 can be connected to a processing center 140 via a computer network 138. Network 138 could include, for example, the Internet, or a proprietary network (in a non-limiting example, a virtual private network such as the BANKNET® network (registered mark of MasterCard International Incorporated, Purchase, N.Y., USA)). Processing center 140 can include, for example, a host computer of an issuer of a payment device. One or more distinct networks can be employed; thus, element 138 is representative of one or more networks, and will be discussed further below.

Stand-alone terminal 134 is representative of a terminal that is not connected to a computer network (either not connected at a particular time, or not connected at all, by design), and is otherwise generally similar to the other terminals described.

An appropriately configured cellular telephone handset 142 can also be employed in infrastructure 100. Handset 142 is depicted in semi-schematic form in FIG. 1, and can include one or more IC chips such as chip 144 including a processing unit 146 and a memory unit 148. Wireless communication with a terminal can be provided via antenna 150 or with a second antenna 180 similar to above-described antenna 120 (i.e., the handset could have a second antenna for the payment application). Note that antenna 180 is depicted schematically, but could be, e.g., a coil antenna as used in a typical "smart" card. Handsets 142 can each be equipped with a suitable display 156. Further, an appropriate power supply 162 can also be provided. Such power supplies can include, for example, a battery and appropriate circuitry. The display and power supply can be interconnected with the processor portion. Different types of portable payment devices can combine or "mix and match" one or more features depicted on the exemplary devices in FIG. 1. Keypad 168 and speaker 174 can be provided. As discussed below, one or more embodiments of the invention have particular applicability to situations where operation without batteries is desired.

It will be appreciated that the terminals 122, 124, 126, 134 are examples of terminal apparatuses for interacting with portable payment devices, in accordance with one or more exemplary embodiments of the present invention. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138.

The above-described devices 102, 112 could be, for example, ISO 7816-compliant contact cards or devices or NFC (Near Field Communications) or ISO 14443-compliant proximity cards or devices. In operation, card 112 can be touched or tapped on the terminal 124 or 126, which then contactlessly transmits the electronic data to the proximity IC chip in the card 112 or other wireless device.

Infrastructure 100 can include a remote storage location 1404 for storing representations of sounds. Such storage can be coupled, for example, to processing center 140. Also included can be a personal computer (PC) 1402 with a payment card reader. By way of example and not limitation, terminals 122, 124, 126 could be coupled to center 140 via the aforementioned virtual private network (VPN), such as that operated by an operator of a payment processing network, while PC 1402 could be coupled to storage location 1404 through an Internet-protocol network, such as that commonly known as the Internet. Element 138 in this case is representative of both networks, that is, the VPN and the Internet. Use of elements 1402, 1404 in connection with an inventive method will be discussed further below. By way of example and not limitation, a payment processing network refers to networks such as the aforementioned BANKNET® network from MasterCard International Incorporated.

Figure 2:
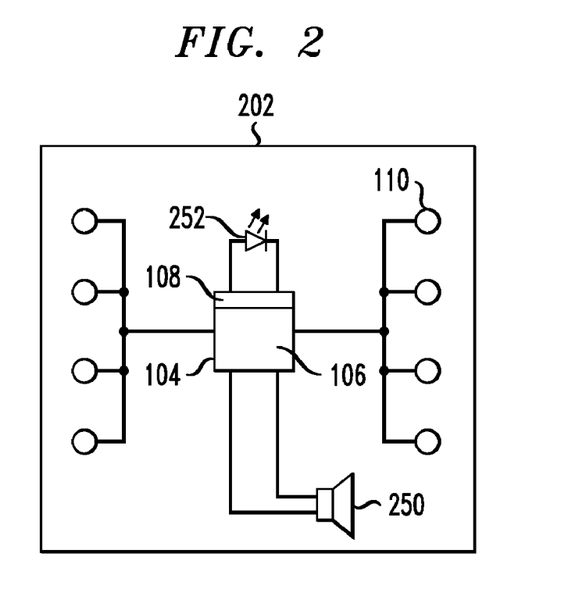
FIG. 2 shows an exemplary embodiment of a payment device according to an aspect of the invention.

FIG. 2 depicts an exemplary embodiment of an inventive payment device 202 for interacting with a payment terminal. The device 202 includes an IC 104 with a memory 108, such as described above, and a processor 106, such as described above, coupled to the memory 108. Also included is a communications module configured to interact with a payment terminal, such as payment terminal 122. The communications module is coupled to the processor 106. The module can be formed, for example, by electrical contacts 110 and appropriate wire leads and control circuitry or software in chip 104. A sound-producing element, such as a miniature speaker 250, is coupled to the processor 106. By way of further example, and not limitation, a piezo-electric element or surface mount audio transducer could also be employed as the sound-producing element.

One example of a speaker could be flat panel Piezo speakers such as those produced by Sonitron in Belgium (www-.sonitron.be). These devices have a weight of 0.4 grams and a thickness of only 1 mm, enabling them to be incorporated into the 1.6 mm thickness of a standard Smart Card. Note, however, that physical reliability concerns may make other configurations appropriate in one or more inventive applications. The smallest model of the just-mentioned Piezo speakers currently on sale has a dimension of 22 mm×20 mm; this may be too large to be mechanically reliable in certain applications, and a smaller version may be needed for such applications. This, however, would likely reduce the low frequency performance (700 Hz in the above-mentioned model). These exemplary speakers present a load of 70 nF in parallel with 2 K-ohms and may easily be driven by a low voltage driver. By way of example and not limitation, two possible implementations are set forth in the immediately following text. A simple operational amplifier ("op-amp") driver or special-purpose Piezo speaker driver chip can be used, or the same could be incorporated into the chip card processor 106, 116. The sound can be generated, for example, by incorporating a MIDI (Musical Instrument Digital Interface electronic communications protocol) synthesizer or by simple delta-sigma modulation in the smart card processor 106, 116. Many current smart card processors can be reused, based on the teachings set forth herein, to generate audio by using the well-known "IO2" line of the processor to generate the necessary sound data. Not all processors have 102

Lines—some low end devices do not have one. Some have replaced the 102 line with USB (Universal Serial Bus) data lines. In this case, based on the teachings herein, one could use a USB sound chip, and communicate with USB protocols, but in one or more embodiments, one might use one of the USB data lines as an 102 line, if the hardware of the chip permits it. Note that the discussion in this paragraph is exemplary in nature, and not intended to be limiting. Other implementations are also possible; for example, employing cards on the market, with transducers, from other manufacturers.

Note also that these piezo loudspeakers can also be used as reasonably efficient microphones. In one or more embodiments where power is available at appropriate times (by way of example and not limitation, contacted applications or contactless applications with an appropriate storage capacitor as discussed elsewhere herein), voice recognition can be employed. For example, the capacitor could be used to store charge sufficient for the cardholder to hold the card or device up to his or her mouth for voice recognition. For storage capacitor embodiments, sufficient charge would have to be stored. A user could hold the card or device near the reader (terminal) to charge the capacitor, and hold the card or device near his or her mouth and speak into it (for example, to enter a personal identification number or the like), then hold up to the terminal again. The foregoing is an example of small-vocabulary speech recognition. The microphone can be coupled to an appropriate acoustic front end, in turn coupled to the processor. Speaker recognition capability could also be provided, for example, as a security feature. Large and small vocabulary speech recognition, as well as speaker recognition, are well known, and the skilled artisan will be able to adopt them to the devices and methods described herein.

A body portion is associated with the memory, the processor, the communications module, and the sound-producing element. The body portion, as noted above, can be, for example, laminated plastic layers of a payment card, well known to the skilled artisan and not separately labeled in the figures. The memory 108 can be configured to store at least one representation of at least one sound. The processor 106 is configured to cause the sound-producing element, such as speaker 250, to produce a sound corresponding to the at least one representation of the at least one sound when such representation is stored in the memory 108. Element 250 is preferably located at the far end of the device from contacts 110 so that it will protrude from terminal 122 during processing and the sound will thus be more audible. Element 250 is also preferably positioned clear of embossing, and inside the antenna 120 in embodiments with antennas. Inclusion of a relatively large ceramic item in proximity to the antenna may affect the tuning of the antenna and the skilled artisan, given the teachings herein, will be able to modify the antenna coil as needed to account for this.

The sound production can be responsive to the communications module interacting with the payment terminal 122. The sound production is accomplished substantially without usage of a battery on the device 202. The sound production can be during or after the interaction with the terminal, and could include a sound produced upon removing the device 202 from the terminal 122. In various embodiments, the sound is produced as soon as power connection is made via contacts 110, or when the authorization request is sent, or (for example, in the case of a contacted card) when the response is received. In a preferred approach, the sound is produced when a positive authorization response is received, so as to indicate an authorized transaction, while no sound is produced if a negative authorization response is received. The skilled artisan is familiar with authorization requests and authorization responses in a payment network. Note that different combinations of the example set forth in this paragraph can be employed, for example, one could have one sound for an approved transaction and another sound for a rejected transaction, or different (or the same) sounds at different points in the authorization process. Where sounds are to be produced after the card or device is no longer in contact with the terminal, a capacitor or other energy storage device, as described below with regard to FIG. 3, may be needed.

In one or more embodiments, the approach of powering the card or other device from contacts 110, rather than using a battery in the card, is believed to offer one or more advantages, such as allowing a larger dynamic range in the sounds, and allowing the use of actual recorded music or other sounds (possibly digitally compressed, for example, via MP3 encoding), as opposed to less-realistic synthesized sounds (although these could also be employed, if desired). In at least some instances, similar advantages may be obtained from one or more embodiments employing capacitors, as discussed elsewhere herein, at least in so far as rapid charging can be effected of a capacitor from contact terminals, which is believed to be the case.

As discussed elsewhere herein, memory 108 can be a traditional or nontraditional form of memory, and can be divided into different types of memory; a non-volatile (persistent) storage is preferably provided for the representation(s) of the sound(s). Different types of memory are flash, EEPROM, and so on. Basically, any type of storage that makes a representation of a sound available to be played by element 250 under control of processor 106 is appropriate. It should be noted at this point that device 202 can be distributed with or without the stored sound representations thereon; thus, devices configured to store and play sounds are considered to be within the inventive scope, whether the sounds have yet been stored thereon.

The sound can be a single tone, but is preferably an audio sequence of multiple (two or more) tones; most preferably a musical selection where the tones are musical notes. Such notes could be the same tone (say, a middle C) at different times (say two consecutive quarter notes) or different tones (say a C followed by a D), and so on. Of course, the sound could also be a polyphonic sound (multiple notes played simultaneously) such as chords and the like. Non-Western music employing a different scale or system of musical representation could also be employed. For example, Asian music could be used. As discussed below, personalized sounds can be used. The musical selection or other sound(s) can, for example, be digitally encoded using any appropriate standard or technique. Sounds may be synthesized or may be digital recordings of actual sounds.

Other non-limiting examples of sounds include directions, such as directions for how to perform a transaction; or marketing promotion such as loyalty rewards, for example, "you will receive $5 off on your next purchase of three bags of ACME potato chips," or "would you like to purchase a paint brush and a can of paint thinner to go with the can of oil-based paint you just purchased?" Marketing promotions could be based on products purchased in a given transaction, or a database of previous transaction (or other personal) information, subject of course to all applicable privacy laws and regulations. Transaction directions could be tailored to the disabled, for example, the visually impaired (for example, announcing to the visually impaired person the amount of the transaction).

The sound-producing element, such as speaker 250, can be used for a wide variety of additional functions, alone or in any combination. These include announcing a pertinent part of the transaction, such as the value, CAP token, merchant name, and the like, for one or more of security, authenticity, or to assist the visually impaired. A "CAP" token is an EMV card-generated cryptogram (CAP=Card Authentication Program), and is designed to allow someone with an EMV and/or M/Chip® card (registered mark of MasterCard International Incorporated, Purchase, N.Y. USA) to use it not for payment but for authentication, for example, in remote banking. The card generates a simplified form of payment token—specifically a "decline," with most of the data fields of fixed format to simplify processing, which is then checked by an Issuer Host on behalf of another service such as logon to a bank account.

In the embodiment shown in FIG. 2, the device 202 is in the form of a standard payment card having an ISO 7810 standard payment card form-factor, although the contacts and other components are not necessarily shown to scale or proportion. Of course, cards with a different form factor could be used. Further, while the inventive techniques are believed to be especially attractive for devices without batteries on-board, inventive techniques could be adapted to non-traditional payment devices as discussed above, such as PDAs, cellular telephones, MP3 players, and the like.

In addition to or in lieu of sound-producing element 250, a visual-stimulus-producing element such as light-emitting diode (LED) 252 could be provided, coupled to processor 106 (leads for LED 252 are shown to memory portion 108 of chip 104 with processor 106, for illustrative convenience). The body portion in such case may also be said to be associated with the element 252 (in general, the body portion is associated with the various elements in that they are contained within or on the body portion, or in operative proximity thereto). Processor 106, in this case, is configured to cause the visual-stimulus-producing element 252 to produce a visual stimulus, responsive to the communications module interacting with the payment terminal 122, again, substantially without usage of a battery on the device. The visual stimulus, such as a flash of light, could take place at any appropriate time, just as described for the sound; flashing could occur at different times and different groupings of flashes, or flashing rates, could signify different things (e.g., acceptance or rejection). The visual-stimulus-producing element may, in other embodiments, comprise a liquid crystal display (LCD) or other visual display, and in such instance the visual stimulus may comprise a text message or the like (for example, indicating the status of the attempted transaction, such as "connected," "paid," "denied" and the like). In one or more embodiments, LCDs may be preferable to LEDs because of lower power consumption.

Figure 3:
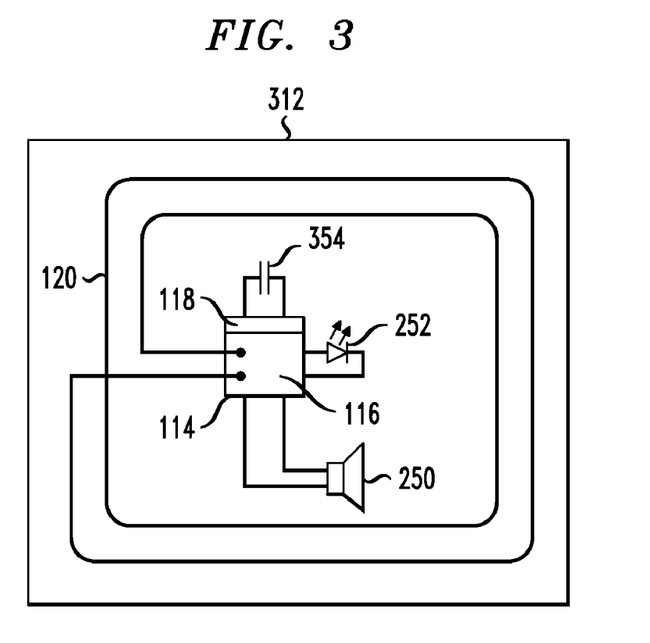
FIG. 3 shows an exemplary embodiment of a payment device according to another aspect of the invention.

FIG. 3 depicts an exemplary embodiment of an inventive payment device 312 for interacting with a payment terminal 124. The device 312 includes a memory 118, such as described above, and a processor 116, such as described above, coupled to the memory 118 (both part of IC 114). Also included is a communications module configured to interact with a payment terminal, such as payment terminal 124. The communications module is coupled to the processor 116. The module can be formed, for example, by antenna 120 together with an oscillator or oscillators, and/or additional appropriate circuitry for one or more of modulation, demodulation, down-conversion, and the like. Elements 250, 252 can be provided as for device 202. In the case of a contactless device 312, an energy storage element, such as capacitor 354, can be employed to power speaker 250 and/or LED 252 (or other sound- or visual-stimulus-producing elements) without the need for a battery. The capacitor can be charged up while device 312 is interacting with terminal 124 via antenna 120—current induced in antenna 120 can be used. One type of capacitor that can be employed is the so-called "Supercapacitor" from Cooper-Bussmann division of Cooper Industries, Boca Raton, Fla., USA. Device 312 can otherwise be similar to device 202.

It should be noted that a typical contactless chip 114 requires power most heavily when processing a received command before sending its response. At other times, the chip typically needs to be quiet, for example when listening for a command or sending a response. The terminal also typically needs the chip to be electrically quiet when communications are happening. At these times, the chip consumes little of the available power. Indeed, some chip card contactless processors need to limit and dissipate the excess power. In one or more embodiments, this excess power, during quiet times, could be output to such an external capacitor 354. The size of the capacitor needs to be sufficient for the length of the sound and the volume desired (or for the duration and intensity of the visual stimulus) (see further discussion below).

In some instances, a capacitor could be used with a contacted card to allow production of sound and/or visual stimuli light after the card was unplugged.

Figure 6:
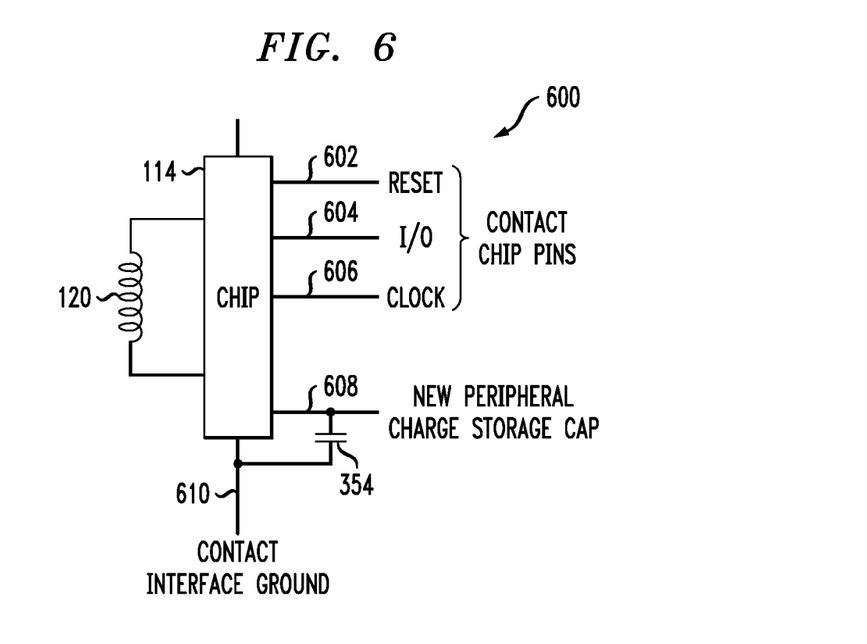
FIG. 6 shows details of one possible implementation of the device of FIG. 3.

In ISO 14443, the clock is 13.56 MHz; however, a typical card tuned circuit would be resonant on approximately 16 MHz. Indeed, such a card tuned circuit might be within +/−1 MHz or so of 16 MHz; it might even be on the low side of 13.56 MHz. However, a card tuned circuit would typically not be tuned to 13.56 MHz. Normally, only the transmitter (that is, the terminal with which the card interfaces) is tuned to 13.56 MHz. In some instances, one could put another tuned circuit on the same card for the purposes of charging a capacitor 354 to power sound or light producing elements 250, 252. In this case the two coils (antenna and capacitor-charging circuit) will likely interact significantly, thus affecting tuning. Therefore, in such an approach, one might need to arrange the two coils to have very low mutual inductance. This may pose difficulty in some cases. To extract power efficiently from such a second coil, a full wave bridge rectifier could be employed in the approach just discussed. However, it is presently believed that a preferred approach will be to modify an existing chip design in accordance with techniques disclosed herein, by an extra power pin on the chip where excess charge can be dumped for use either by the same chip or for use by a second chip. Current contactless chip card ICs normally have on-board capacitors for resonance, followed by a bridge rectifier and a (relatively small) storage capacitor. The latter may not be sufficient for embodiments of the invention, typically being a few tens or hundreds of pF. Thus, it is presently believed that an off-chip capacitor such as 354 is the preferred approach. The card can be deliberately tuned off frequency to improve performance of the communications and to help regulate power transfer (if one brings it close, the transmitter detunes, delivering less power). Thus, with reference to FIG. 6, in one particular possible circuit implementation 600 of the card 312 of FIG. 3, chip 114 and inductor 120 are provided as before. Contactless chip 114 is of the kind having contact chip pins for reset, input/output, and clocking, as at 602, 604, and 606, respectively. The "extra power pin" is provided at 608, while capacitor 354 is implemented as the above-discussed off chip peripheral charge storage capacitor, connected between pin 608 and, for example, a contact interface ground point 610 provided on contactless chip 114.

Devices 202, 312 in FIGS. 2 and 3 preferably conform to the above-mentioned EMV standard. So-called chip cards or smart cards are non-limiting examples of the types of devices that can be configured according to the teachings herein.

Figure 4:
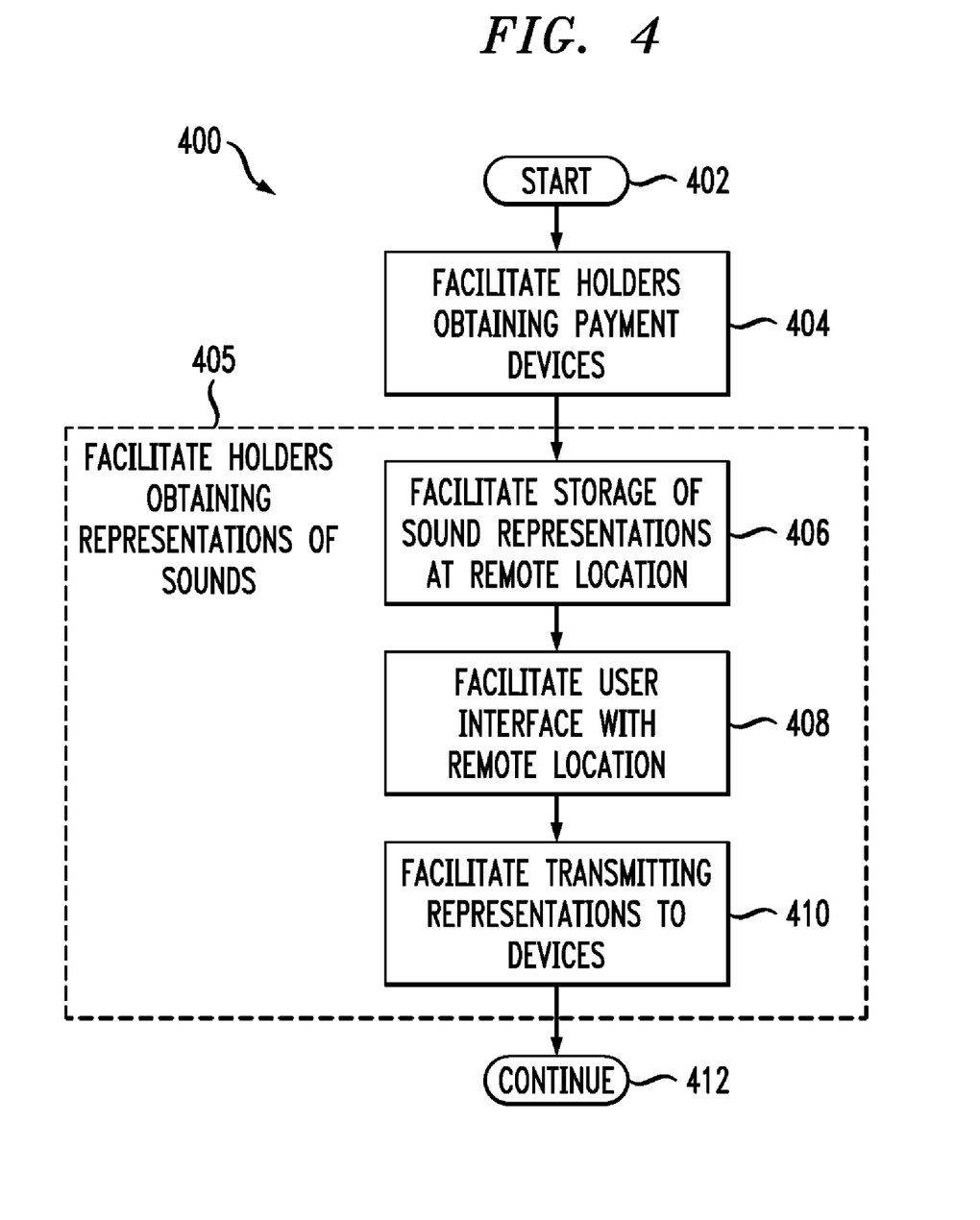
FIG. 4 shows a flow chart of exemplary method steps for providing a service for payment device holders, according to yet another aspect of the invention.

FIG. 4 shows a flow chart 400 of exemplary steps in a method of providing a service for payment device holders. After beginning at step 402, the method includes the step 404 of facilitating the holders obtaining, for example, payment devices (in some instances, any electronic device configured according to a payment infrastructure standard can be used—for example, an MP3 player having a communications interface allowing it to communicate with a terminal in accordance with the EMV standard or a similar payment infrastructure standard). The devices are preferably of the kind described herein, but could include other devices, including devices that have on-board battery power for flashing lights or playing sounds, and indeed can be applied to any card or device with the capability to play sounds, whether debit, credit, pre-paid, or other, and whether or not an on-board battery is present. Step 405 includes facilitating the holders obtaining representations of sounds to be stored in memories of the devices. Each holder can obtain one or more sound representations to be stored; thus, the cards or other devices can be personalized to the musical preferences of the holders.

In one or more embodiments, step 405 includes the substeps 406, 408, and 410, to be described now. Step 406 includes facilitating storage of the representations at least one location (for example, location 1404) remote from the payment devices 202, 312, the at least one location being coupled to a payment network (for example, the above-discussed VPN). Step 408 includes facilitating the users interfacing the devices to terminals 122, 124 of the payment network. Step 410 includes facilitating transmitting the representations to the devices of the users via the payment network. Processing continues at 412. These specific steps could be conducted, for example, at an automatic teller machine (ATM) that was a terminal in the payment network. However, in another approach, step 405 can be accomplished differently. For example, a user can employ a PC 1402 with a card reader to go to an Internet web site through which storage 1404 can be accessed for downloading sounds to the device through the reader. The service described could be offered, by way of example and not limitation, by acquirers, merchants, issuers, operator(s) of payment networks, and the like, and could be "switched," for example, through the operator of the payment card network. The sound(s) downloaded could be any of the kinds of musical or other sounds discussed herein.

In another aspect, representations of sounds to be downloaded might be stored elsewhere than location 1404, or might be stored in one or more intermediate locations, besides location 1404. For example, a terminal (broadly encompassing any point-of-sale device) at a merchant location could store one or more representations of sounds to be downloaded to cards or other payment devices; such representations may be obtained by the terminal from location 1404 or otherwise. In yet another aspect, the representations might not be stored on the terminal per se, but at another location at the facility of the merchant, accessible to the terminal via a network. In any event, the representations may be obtained by the card or other device from the terminal by interactions in accordance with a payment system standard, such as the aforementioned EMV or the like. In some instances, representations of sounds obtained in this way (or in other ways) may be personalized for the holder of the card or other device. For example, the representation of the sound may be a representation of a musical clip related to merchandise purchased by the holder of the card or other device—a person who purchased boxing gloves might have the theme from the motion picture "Rocky" downloaded to his or her card or other device. The sounds could also be selected (by the merchant, the holder or other user, or otherwise) to create an emotional bond between the cardholder (or other user of the device) and the device—for example, by playing a favorite piece of music, a theme associated with a favorite sports team, television program, and so on. The sounds could, in some instances, be a so-called "jingle" or other material identified with the merchant.

In still another aspect, representations of sounds can be sent to payment chips in cellular telephone handsets or other devices, and the telephone or other device would play the sound when using the payment chip. One example would be a chip implementing the MASTERCARD PAYPASS® system (registered mark of MasterCard International Incorporated, Purchase, N.Y., USA). When the PAYPASS® device was tapped to make a payment, the customized sound would be played.

In some instances, downloaded sounds have significance with regard to a putative transaction; the type of sound or the time when it occurs may signify acceptance, rejection, a particular point in the transaction flow, and so on. Thus, optional method steps include facilitating presentation of a device to a terminal during a putative transaction, and facilitating the processor on the device to cause the sound-producing element to produce the sound, where the sound has a predetermined significance with regard to the putative transaction.

It should be noted that, as used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

Figure 5:
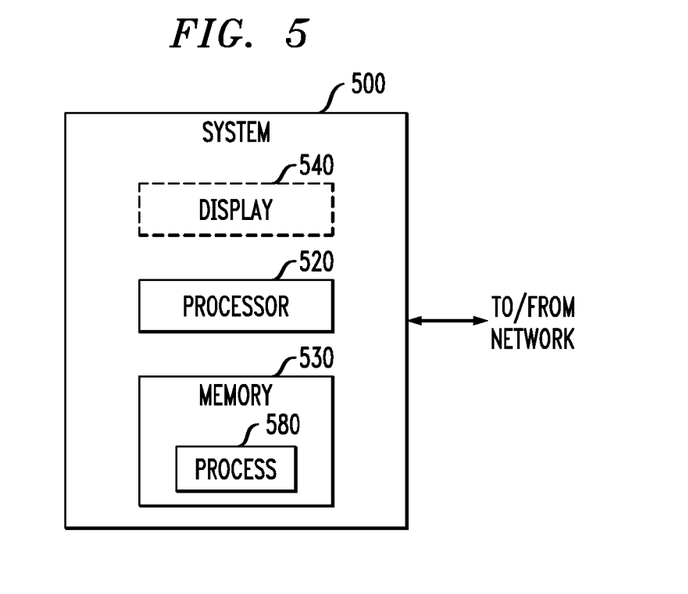
FIG. 5 is a block diagram of an exemplary computer system useful in one or more embodiments of the present invention.

The invention can employ hardware and/or software aspects. Software includes but is not limited to firmware, resident software, microcode, etc. Software might be employed, for example, in connection with a terminal 122, 124, 126, 134. Firmware might be employed, for example, in connection with payment devices such as cards 102, 112, 1302, 202, 312. FIG. 5 is a block diagram of a system 500 that can implement part or all of one or more aspects or processes of the present invention. As shown in FIG. 5, memory 530 configures the processor 520 (which could correspond, e.g., to processor portions 106, 116, 146, 1306) to implement one or more aspects of the methods, steps, and functions disclosed herein (collectively, shown as process 580 in FIG. 5). The memory 530 could be distributed or local and the processor 520 could be distributed or singular. The memory 530 could be implemented as an electrical, magnetic or optical memory, or any combination of these or other types of storage devices (including memory portions as described above with respect to cards/devices 102, 112, 142, 1302, 202, 312). It should be noted that if distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an ASIC rather than using firmware. Display 540 is representative of a variety of possible input/output devices.

System and Article of Manufacture Details

As is known in the art, part or all of one or more aspects of the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. These comments apply equally to the storage for the sounds, in the devices 202, 312 and/or in location 1404.

The computer systems and servers described herein each contain a memory that will configure associated processors to implement the methods, steps, and functions disclosed herein. Such methods, steps, and functions can be carried out, e.g., by processing capability on elements 102, 112, 142, 122, 124, 126, 134, 140, 202, 312, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention, such as, for example, the aforementioned terminals 122, 124, 126, 134 or payment devices 102, 112, 142, 1302, 202, 312 can make use of computer technology with appropriate instructions to implement method steps described herein. By way of further example, a terminal apparatus 124, 126, 134 could include a communications module, an antenna coupled to the communications module, a memory, and at least one processor coupled to the memory and the communications module and operative to interrogate a contactless payment device (in lieu of the antenna and communications module, appropriate contacts and other elements could be provided to interrogate a contact payment device such as a contact card, as in terminal 122).

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A payment device for interacting with a payment terminal, said device comprising:
   a memory;
   a processor coupled to said memory;
   a communications module configured to interact with the payment terminal, said communications module being coupled to said processor;
   a visual-stimulus-producing element coupled to said processor;
   a body portion associated with said memory, said processor, said communications module, and said visual-stimulus-producing element; and
   a capacitor coupled to said processor and configured to charge when said payment device is receiving sufficient power from the payment terminal and to power said visual-stimulus-producing element when said payment device is not receiving sufficient power from the payment terminal;
   wherein:
   said processor is configured to cause said visual-stimulus-producing element to produce a visual stimulus, responsive to said communications module interacting with the payment terminal, substantially without usage of a battery on said device;
   at least said memory and said processor are realized on an integrated circuit chip; and
   said capacitor comprises an off-chip peripheral charge storage capacitor;
   further comprising:
   an extra power pin on said integrated circuit chip; and
   a ground associated with said payment device;
   wherein said capacitor is connected between said extra power pin and said ground, and wherein said processor is configured to cause said capacitor to charge when said integrated circuit chip is in a quiescent state.

2. The device of claim 1, wherein said communications module comprises at least contacts coupled to said processor and configured to obtain electrical power from the payment terminal.

3. The device of claim 1, wherein said communications module comprises at least an antenna coupled to said processor and configured to wirelessly interface with the terminal, said device further comprising a capacitor coupled to said processor and configured to power said visual-stimulus-producing element.

* * * * *